United States Patent [19]
Haar

[11] Patent Number: 5,922,969
[45] Date of Patent: Jul. 13, 1999

[54] METHOD AND APPARATUS FOR MEASURING THE VOLUME OF FLOWING LIQUIDS

[75] Inventor: Thomas Haar, Halstenbek, Germany

[73] Assignee: Alfons Haar Maschinen Bau GmbH & Co., Hamburg, Germany

[21] Appl. No.: 08/789,015

[22] Filed: Jan. 27, 1997

[51] Int. Cl.⁶ .................................................. G01F 15/02
[52] U.S. Cl. ........................ 73/861.02; 73/200; 73/198; 73/861.03
[58] Field of Search .............................. 73/861.02, 861.01, 73/861.03, 861.04, 195–202, 19.1, 19.11, 149, 290 B, 290 V, 291, 293, 1.27, 1.31, 1.34, 1.36, 861

[56] References Cited

U.S. PATENT DOCUMENTS

| | | | |
|---|---|---|---|
| 3,867,955 | 2/1975 | Scott et al. | 73/200 X |
| 3,963,146 | 6/1976 | Esbjörnsson | 73/200 X |
| 4,429,581 | 2/1984 | Furmaga | 73/195 X |
| 4,467,826 | 8/1984 | Lorentz | 137/188 |
| 5,232,006 | 8/1993 | Brehmer et al. | 137/183 |

FOREIGN PATENT DOCUMENTS

| | | |
|---|---|---|
| 3723943 | 2/1988 | Germany . |
| 86995 | 4/1993 | Japan .................................. 73/861.02 |
| WO 95/10028 | 4/1995 | WIPO . |
| WO 95/26494 | 10/1995 | WIPO . |

OTHER PUBLICATIONS

*Patent Abstracts of Europe* (DE 03723943 A1) Feb. 18, 1988, Walter Nicolai "Device for measuring . . . ".

*Primary Examiner*—Thomas P. Noland
*Attorney, Agent, or Firm*—Vidas, Arrett & Steinkraus, P.A.

[57] ABSTRACT

A method for measuring the volume of flowing liquids under avoidance of measuring errors owing to undesired high gaseous content, wherein the gaseous content of the liquid flowing through a conduit is measured, the deviation of the detected gaseous content from an allowable value is determined, the volume flow of the liquid is influenced in a plurality of steps or continuously in response to the determined deviation, and the volume of the flowing liquid is measured.

22 Claims, 3 Drawing Sheets

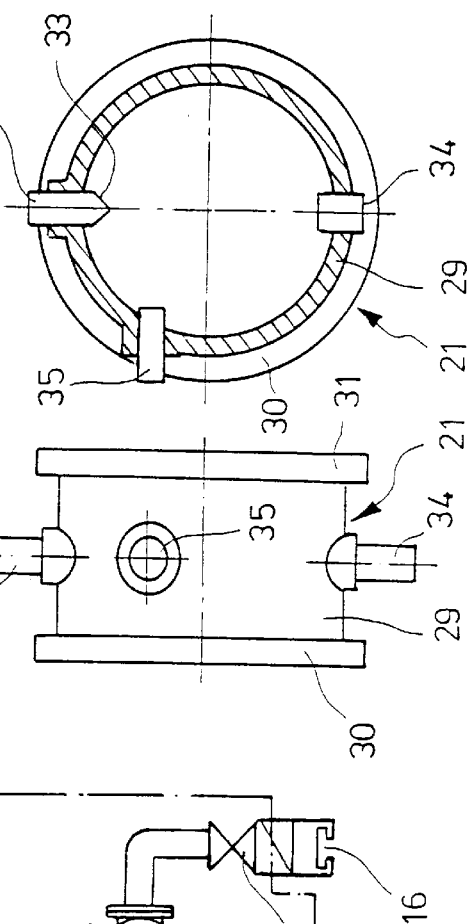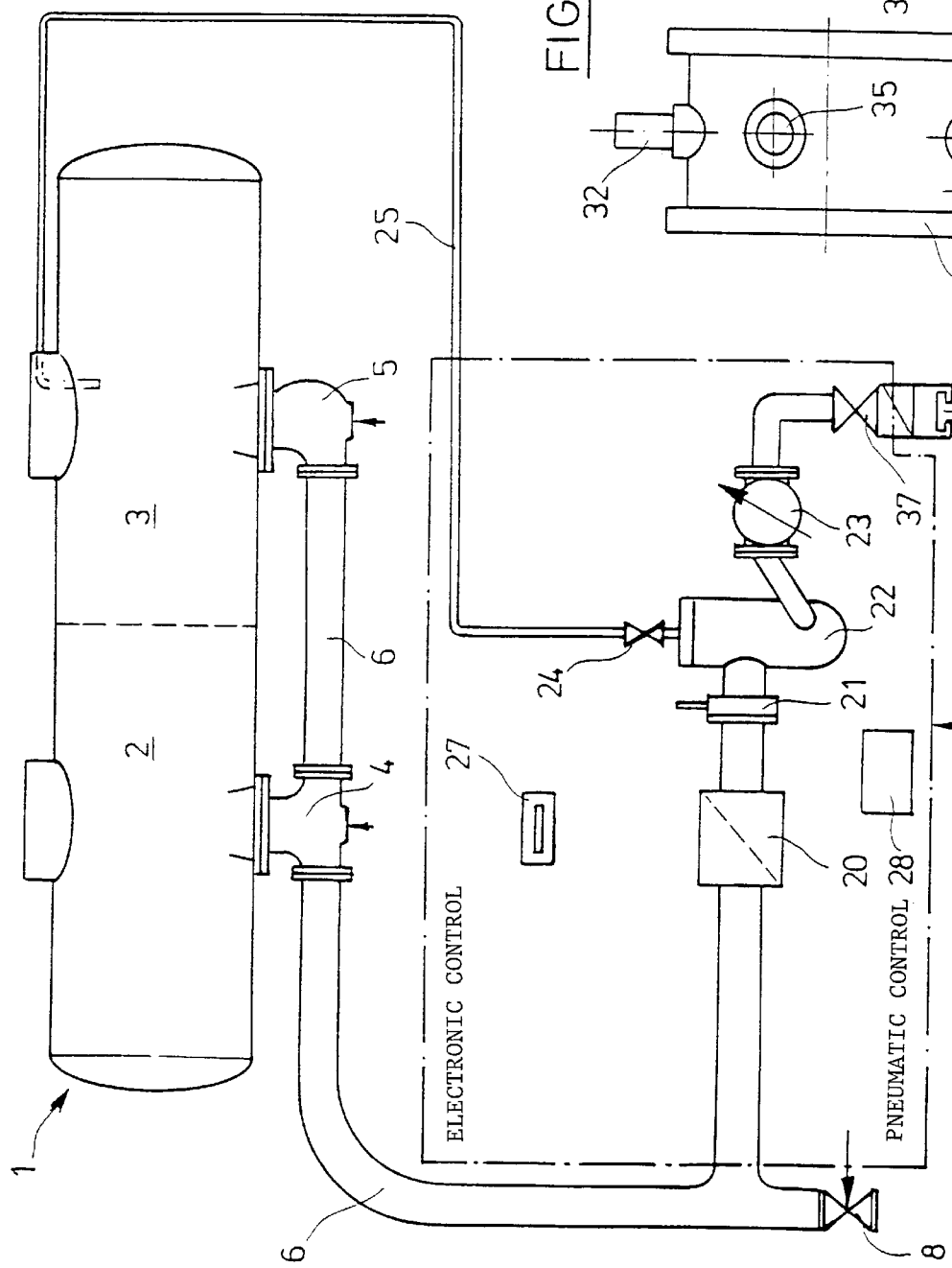

METHOD AND APPARATUS FOR MEASURING THE VOLUME OF FLOWING LIQUIDS

BACKGROUND OF THE INVENTION

The invention refers to a method and an apparatus for measuring the volume of flowing liquids under avoidance of measuring errors by undesired high gaseous contents.

Method and apparatus are in particular suited for the use in tank trucks, e.g. for bunker oil or combustion oil or Diesel oil. During the delivery of liquid air may be trapped, above all by a change from one chamber of the tank truck to another chamber or during the complete evacuation of the chamber. An introduction of air into the liquid can also be caused by leakages of the conduit system. Further, air may be introduced during delivery by gravity owing to a subpressure in the conduit system. Gaseous contents, however, are falsifying the measurement of the volume of liquid delivered. Bureaus of standards, therefore, require that the gaseous contents of liquids are not to exceed desirable values.

To this purpose conventional measuring systems are provided with degassing means which include a collection container or vessel for air through which the liquid flows. Such degassing means have a level sensor which detects the collection of a predetermined volume of gas in order to stop the flow of liquid and to vent the container. By this it is secured that gauging means positioned downstream are not filled up with gases to an undesired amount so that undesired errors occur with measuring the volume of flowing liquids.

Furthermore, measuring systems are known working with electronic sensors which are suited to detect air bubbles in the flowing liquid and have an adjustable sensitivity. If a predetermined level of the air content is exceeded, the flow of liquid is stopped and the conduit is vented in order to avoid an undesired measuring value caused by an air content.

All known systems have the disadvantage that with a high technical inventory (means preventing the measuring of gas contents or bubble sensor with expensive degassing means) only signals are generated for two modes of this system. In one mode the delivering system delivers liquid under full power, and in the other mode the dispensing of liquid is completely interrupted and a venting process switched on. In case of liquid dispense under standard or gauge conditions this results in nervous switching phenomena between these modes. As a result, the delivery of liquid may be considerably delayed. Furthermore, the known measuring means consume a considerable space which has to be considered by the manufacturers of trucks. This above all is valid for apparatuses which prevent the measuring of gaseous liquids which normally are compact aggregates.

An object of the invention is to provide a method and an apparatus for measuring the volume of flowing liquids which require a reduced technical inventory, has a larger capacity and a reduced need of space.

BRIEF SUMMARY OF THE INVENTION

In the measuring technique according to the invention the gaseous contents of a liquid flowing through a conduit is permanently detected or from time to time. In dependence on the deviation of the measured gaseous contents from an allowable value the volume flow of a liquid is influenced such that upon an elevated gaseous content the volume flow is reduced to an extent that the gaseous content again reaches the desired value. Vice versa with a gas content below the allowable value the volume flow can be increased until the gaseous content attains the allowable value. The invention makes use of the experience that the gaseous content of a liquid decreases with a reduced flow rate through a self degassing. This gaseous content is collected in a container or a smoothing section downstream of the bubble detector from which the gas is vented or removed upon a predetermined level of the liquid, with the liquid standing still. However, the invention does not use the dependency of the gaseous content from the flow rate for a simple two-point control which only knows the modes of complete interruption of the volume flow and of complete dispense of the volume flow. Rather, it provides the influence of the volume flow in dependence on the detected deviation of the measured gaseous content from the allowable value by a plurality of steps and/or continuously. In this manner the volume of the flowing liquid is discharged or dispensed meeting the standards of the gauge authorities.

With the measuring technique according to the invention the liquid flow which is to meet the standards can be regulated down nearly adjacent the separated liquid/air phase flow along the error limit without interrupting the dispensing of the liquid and without tolerating an non-allowable error in the measuring apparatus. The discharge of liquids from tank trucks which are to meet standards can be carried out efficiently without frequent switching operations of the measuring apparatus. The measuring apparatus can be structured smaller, lighter and more variable. Furthermore, it can be more easily installed in tank trucks.

The allowable value for the gaseous content can be adjustable so that the measuring technique can be adapted to the corresponding requirements. It is further of advantage that an electronic processing of the measuring value and the determination of the controller output is possible and make use of conventional electronics for such measuring system can be made.

For the determination of the gaseous content in the liquid an air bubble sensor can be used. Such a sensor may detect the gaseous content optically or acoustically, e.g. by reflection effects. A light emitter and a light receiver may be associated with a conduit flown through. For the detection of the corrected value this means may check the detected gaseous content.

The gas bubble sensor of this kind with its processing electronic is in a position to quantitatively determine the air content in the instant flow of liquid. The same means may control the allowable liquid level in the degassing means in order to initiate the venting process if an allowable value has fallen below. As already mentioned above, a separation of liquid and gas takes place with lower flow speeds in the conduit. For technological reasons the gas volume must not exceed predetermined limits.

In order to eliminate errors the transmission of a test signal (light beam or a directed acoustic signal) may traverse the liquid, and the reflection of the test signals transverse to the emission direction may be detected, with the gaseous content of the liquid may be calculated from the quotient of the detected values. This formation of a quotient reduces remarkably the influence of interferences, e.g. by the turbidity of the medium or the contamination of the sensors.

The liquid may be pumped through the conduit by a displacement pump. If the liquid is pumped under surmount of a counterpressure which may be generated by a break pressure regulating valve the volume flow of the pump breaks down upon an air trapping. Already by this measure the allowable value for the gaseous content of liquid can be reached. Thus, the pump may replace the means for the detection of a gaseous content, the determination of the deviation from the allowable value and the influencing of the volume flow of the liquid in order to arrive at a simple measuring embodiment. Preferably, this effect is used in connection with the known means.

The means for influencing the volume flow is preferably a pump with a controllable volume flow. It can be driven with a constant speed and includes an adjustable pressure relief valve in a bypass circuit to influence the volume flow.

For the discharge of liquid the conduit may be defined as a gravity section. Then, the means to influence the volume flow can be formed by an adjustable valve.

Preferably, the measuring technique is combined with a degassing means. As to this, the collection vessel can be made much more smaller than with known degassing means (e.g. 6 liters over against 20 to 25 liters).

BRIEF DESCRIPTION OF THE SEVERAL VIEWS OF THE DRAWING

Embodiment examples of the invention are subsequently explained along accompanying drawings. In the drawings

FIGS. 2 and 3 show an optical air bubble sensor in a lateral view (FIG. 2) and in cross section (FIG. 3);

FIG. 4 shows a measuring system with a discharge by gravity in a diagrammatic view.

DETAILED DESCRIPTION OF THE INVENTION

In the subsequent description of various embodiment examples identical parts are designated with identical reference numbers. Insofar the description is valid for the total of embodiment examples.

Figure 1:
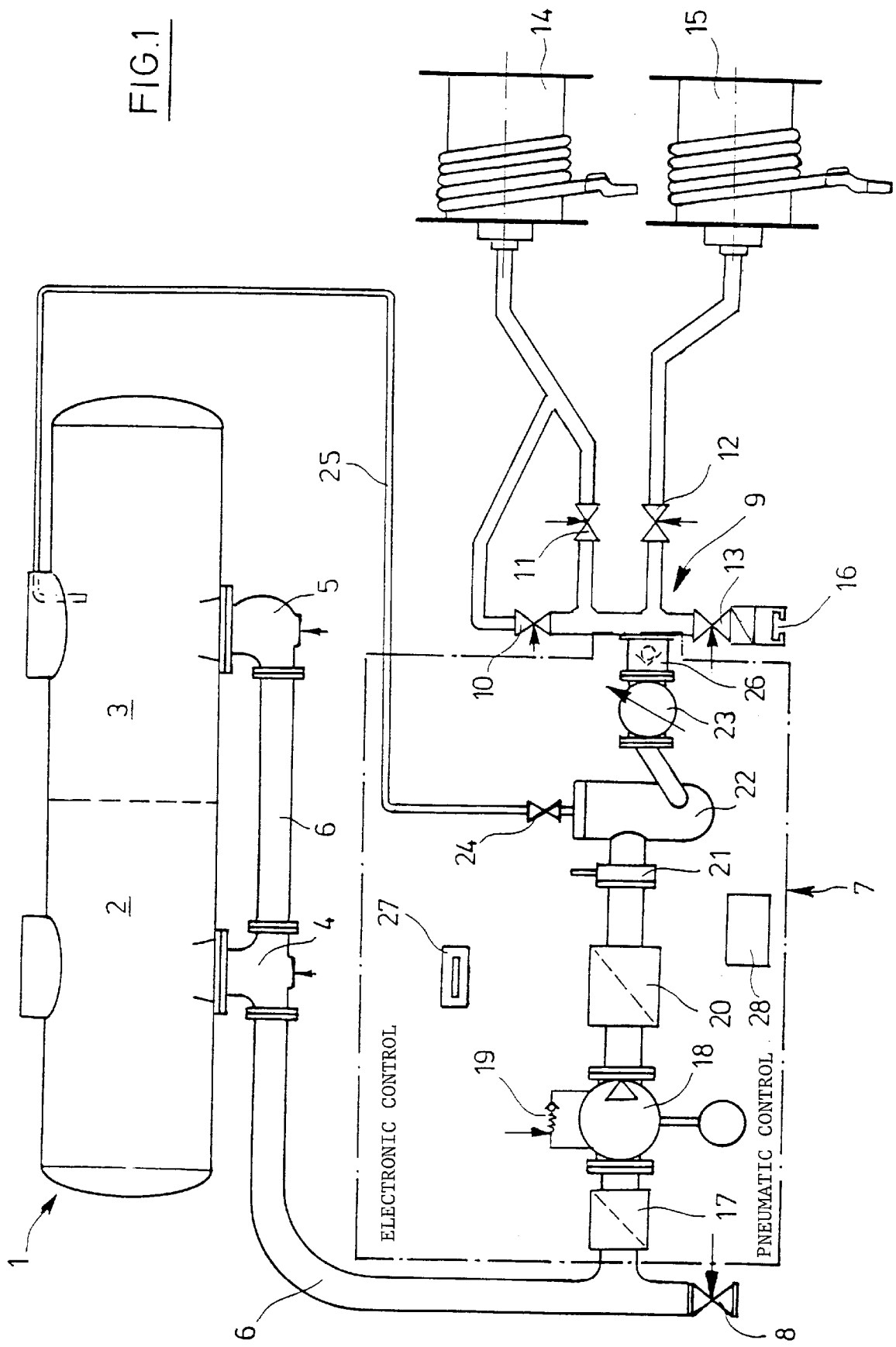
FIG. 1 shows a measuring system with a displacement pump in a diagrammatic view.

According to FIG. 1 a tank 1 of a tank truck is divided into different chambers 2 and 3. These are connected to a measuring system 7 through connecting pipes 4, 5 and pipes 6. The measuring system is within the limits indicated by a dash-dotted line. The liquid can be drained through a valve 8 upstream of the measuring system. Downstream of the measuring system a liquid divider 9 is located through which the liquid is passed to hose drums 14, 15 or a coupling part 16 through shut-off elements 10, 11, 12, 13.

At the inlet the measuring system 7 a protection filter 17 is provided through which the liquid is passed to a displacement pump 18 driven with a constant speed. In a bypass to the displacement pump 18 a relief valve 19 is located which is pneumatically controlled.

At the pressure side of the displacement pump 18 a protection filter 20 for a counter is connected. The liquid is passed to a gas bubble sensor 21 downstream of filter 20, the structure of the sensor being described in more detail below. A degassing container 22 is connected to the outlet of gas bubble detector 21. From the gas bubble detector 21 liquid is passed to the upper portion of degassing container 22. The liquid is removed from the degassing container 22 at the bottom portion and passed to means for measuring the volume in the form of a counter 23.

A venting valve 24 is connected through the top of the degassing container 22, the valve 24 being connected with the chambers 2, 3 of tank 1 through a conduit 25.

The outlet of counter 23 is connected to a pressure regulating valve 26. Downstream of the pressure regulating valve 26 the measuring system is connected to the liquid divider.

Besides, the measuring system includes an electronic control 27 and a pneumatic control 28. The electronic control 27 is connected to the gas bubble sensor and evaluates the signals thereof. It transmits control signals to the pneumatic control 28 which controls the various valves of the system. Furthermore, recording and indicating means can be connected to the controls 27, 28.

According to FIGS. 2 and 3, the gas bubble sensor 21 has a substantially cylindrical basic body 29 with connection flanges 30, 31 at both ends. At the top of the basic body 29 an infrared light emitter and receiver 32 is mounted having an emission axis directed diagonally through the cross section of the basic body 29. At the lower end of the emitter and receiver 32 a prism 33 is located through which IR-radiation is passed at the presence of liquid and radiation is deflected into the interior of emitter and receiver 32 at the absence of liquid. The reflected light is detected by the integrated receiver of the emitter and receiver 32.

In the lower portion of the basic body an IR-receiver 34 is located which is aligned with the emission axis of the emitter and receiver 32. A further receiver 35 is integrated in the upper portion of basic body 29. This receiver 35 is directed perpendicular to the emission axis of emitter and receiver 32.

If liquid flows through the gas bubble detector 21, the radiation energy impinging receiver 34 is reduced with increasing gas bubble content in the flow, and the light energy reflected or scattered towards receiver 35 increases with the gas bubble content in the flow. These interrelations are linear at least in the here interesting gas bubble concentration of 0 to 5%. An evaluation means forms a quotient from the radiation values measured by the receivers 34 and 35. This quotient is nearly independent from influences by interferences.

The gas bubble detector 21 is also a level sensor. If the liquid level falls down below prism 33 at the lower end of emitter and receiver 32 the integrated receiver detects the impinging light and thus indicates the liquid falling down below a predetermined level. For an adjustment of the indicated liquid level the emitter and receiver 32 can be displaced along a diagonal axis and locked at arbitrary positions.

Figure 5:
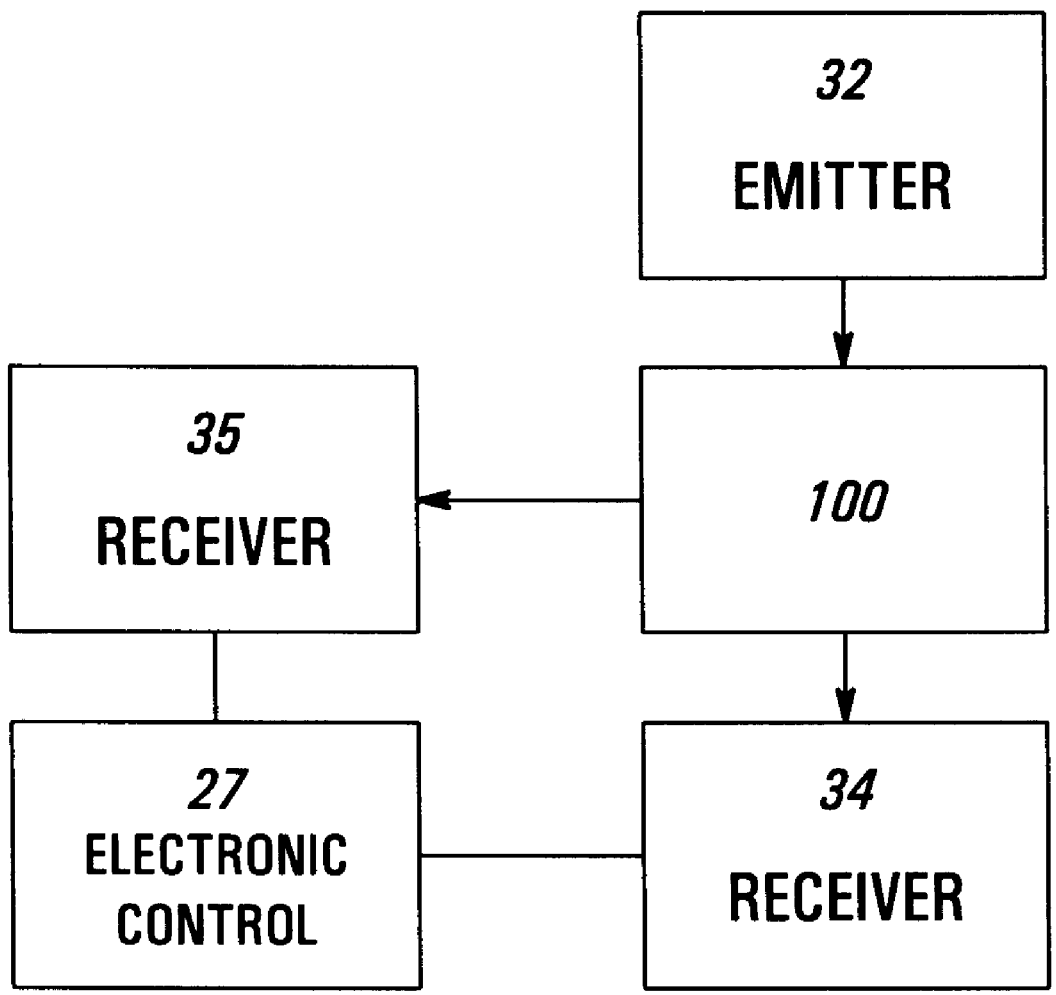
FIG. 5 shows a block diagram illustration of the optical or acoustic air bubble sensor with an evaluation means.

The block diagram of FIG. 5 illustrates the relationships of the various components of such optical type sensors including but not limited to the preferred IR-radiation type. Furthermore, the various elements illustrated in FIG. 5 that utilize optical radiation of any sort may also be read to include those embodiments which utilize acoustic energy as well.

As the liquid enters the gas bubble detector 21 it passes into a space 100 defined by the interior of basic body 29, the optical emitter and receiver 32 sends optical radiation through space 100. The optical radiation is received by optical receiver 34. As the optical radiation encounters gas bubbles contained in the liquid, a portion of the radiation will be reflected towards and received by optical receiver 35.

Both optical receivers 34 and 35 are in electronic communication with electronic control 27. Electronic control 27 utilizes conventional electronics to act as an evaluation means in order to form a quotient from the values received by optical receivers 34 and 35. The resulting quotient is proportional to the actual quantity of gas present in the liquid.

The electronic control 27 will then compare the proportional value to a predetermined value which is representational of the allowable level of gas that the liquid may contain. If the proportional value (i.e. the level of gas present in the liquid) is less than the predetermined allowable value, electronic control 27 will signal pneumatic control 28 to increase liquid flow. Likewise, if the quotient exceeds the pre-determined value then the electronic control will signal for a decrease in flow.

Using a transverse receiver 35 to detect reflected radiation in addition to merely detecting the radiation received by a direct axial mounted receiver 34 results in a gas measurement system wherein the influence of any potential interferences on the measurement is remarkably reduced.

If liquid is discharged from tank 1 through the measuring system 7, the gas bubble detector 21 determines the gas bubble content and the level of liquid, respectively. If an allowable value is exceeded, the controls 27, 28 serve for a change of the liquid flow in that the relief valve 19 is actuated until the allowable value is reached or is smaller. If the measured value is smaller than the allowable value, the discharged liquid flow can be increased up to the allowable value by corresponding control measures. If the liquid level in the conduit system falls below the value detected by the gas bubble detector of emitter and receiver 32, the danger exists that undesired high gas contents are dragged along. Then, the controls 27, 28 take care that no longer liquid passes to the measuring system 7, and the venting container 22 is vented through venting valve 24.

In this way it is guaranteed that no liquid with an undesirable high gas content reaches counter 23. The pressure regulating valve 26 effects a compression of the gaseous contents in the liquid already in the displacement pump 18 and cannot falsify the measurement. The sum of all measures guarantees a discharge meeting the gauging standards and a very high discharge capacity.

In the system of FIG. 4 a coupling 16 is located below tank 1 allowing a liquid dispensing by gravity. A simple measuring system 36 for the passing liquid volume is located between tank 1 and coupling part 16. At the inlet the measuring system 36 a protection filter 20 for the counter is provided, with a gas bubble detector 21 being positioned downstream of filter 20. Downstream of detector 21 a venting container 22 is positioned, and downstream of container 22 a counter 23 is positioned. The venting container 22 is also vented through a venting valve 24 towards tank 1.

Instead of a pressure regulating valve an adjustable discharge valve 37 is located downstream of counter 23. The discharge valve 37 is controlled through the electronic control 27 and the pneumatic control 28.

If gas bubble detector 21 detects an undesired high gaseous content in the liquid discharged, the discharge valve is closed partially through control 27, 28 so that the liquid discharge is throttled and the gaseous content decreases. Vice versa valve 37 can be opened more with lower gaseous content. In this manner the measuring system 36 can control the liquid flow permanently such that an allowable gaseous content is reached or maintained. In case the level of the liquid in gas bubble detector 21 falls below an allowable value the introduction of liquid in the container 22 is interrupted and it is vented through venting valve 24 until the system may be operated further upon arrival at the allowable value. Therefore, also with a discharge by gravity a maximum discharge performance can be achieved.

I claim:

1. A system for measuring the volume of flowing liquid under avoidance of measuring errors due to undesired gaseous contents comprising a conduit for the flow through of said liquid, a means for sensing the gaseous content of the liquid in said conduit, the means for sensing the gaseous content constructed and arranged to include an optical emitter, an optical receiver located on the axis of said optical emitter and a further optical receiver located transverse to said axis, a means for detecting a deviation of the detected gaseous content from an allowable value and generating an adjustment value depending thereupon, means for influencing the volume flow of said liquid in said conduit in response to said adjustment value, and means for measuring the volume of the flowing liquid.

2. The system of claim 1, wherein the means for detecting the gaseous content includes an evaluation means for forming the quotient from the signals from both said receivers.

3. The system of claim 1, wherein the means for sensing the gaseous content generates an electrical signal.

4. The system of claim 1, wherein means are provided detecting the level of the liquid in said conduit and/or in a vessel downstream thereof upstream of the means for measuring the volume of the flowing liquid, degassing means being associated with said conduit and/or said vessel upstream of said means for measuring, with said degassing removing the gaseous content emerging in said conduit and/or in said vessel at a predetermined level of said liquid.

5. The system of claim 1, wherein a displacement pump for conveyance of said liquid is positioned upstream of said conduit.

6. The system of claim 5, wherein a pressure regulating valve is associated with said conduit downstream of the measuring means.

7. The system of claim 5, wherein a displacement pump with an adjustable flow rate is provided for influencing said volume flow.

8. The system of claim 7, wherein the displacement pump is driven with a constant speed and bypassed by an adjustable relief valve as said means for influencing the volume flow.

9. The system of claim 1, wherein said conduit is a path for gravity conveyance of said liquid.

10. The system of claim 9, wherein the means for influencing the volume flow is an adjustable valve positioned downstream of said measurement means for influencing of said volume flow of said liquid.

11. The system of claim 1, wherein an acoustical means is provided for the detection of the gaseous content including an emitter and a receiver for acoustic waves.

12. The system of claim 11, wherein the acoustic means include an emitter, a receiver located on the axis of said emitter and a further receiver located transverse to said axis.

13. A method for measuring the volume of flowing liquids under avoidance of measuring errors due to undesired high gaseous content comprising the steps of:

a) transmitting a control signal in an emission direction through the liquid to a first receiver opposingly positioned relative to the emitter, the first receiver constructed and arranged to detect the control signal and assign a value to the control signal detected, the control signal exhibiting the characteristic that when passed through gas bubbles present in the liquid a portion of the control signal will be reflected to a second receiver positioned transverse to the emission direction, the second receiver constructed and arranged to detect the reflected signal and assign a value to the reflected signal detected;

b) measuring the actual gaseous content of a liquid flowing through a conduit by calculating a quotient derived by comparing the values received by the first receiver and by the second receiver, the quotient being proportional to the actual quantity of gas present in the liquid;

c) determining the difference between the measured gaseous content and a predetermined allowable gaseous level;

d) changing the volume flow of the liquid in dependance of the determined difference level so that the volume is reduced with increasing gaseous content and enhanced with decreasing gaseous content;

e) collecting the actual gaseous content of the liquid by selfdegassing in a collection area;

f) removing the separated gaseous content when the liquid reaches a predetermined level; and g) measuring the volume of the liquid downstream of the collection area.

14. The method of claim 13, wherein the liquid flowing through the conduit is pumped at a variable volume by a displacement pump against a counterpressure that is dependant upon the level of actual gaseous content of the liquid.

15. The method of claim 14, wherein the volume flow of the liquid pumped is influenced by a feeding back of a large portion thereof.

16. The method of claim 13, wherein the liquid is conveyed by gravity.

17. The method of claim 16, wherein the volume flow is influenced by adjusting a discharge valve.

18. The method of claim 13, wherein measuring the actual gaseous content of the fluid is by the transmission of a light signal in an emission direction thereof through the liquid and a reflection of the light signal transverse to the emission direction are detected, and the gaseous content of the liquid is calculated by the quotient of the detected values, said quotient being calculated by an evaluation means.

19. The method of claim 13, wherein measuring the actual gaseous content of the fluid is by the transmission of an acoustic signal in an emission direction thereof through the liquid and a reflection of the acoustic signal transverse to the emission direction are detected, and the gaseous content of the liquid is calculated by the quotient of the detected values, said quotient being calculated by an evaluation means.

20. The method of claim 13, wherein the level of the liquid is detected optically.

21. The method of claim 13, wherein the level of the liquid is detected acoustically.

22. A method for measuring the volume of flowing liquids under avoidance of measuring errors due to undesired high gaseous content comprising the steps of:

a) transmitting an acoustic signal in an emission direction through a liquid to a first receiver opposingly positioned relative to the emitter, the first receiver constructed and arranged to detect the acoustic signal and assign a value to the acoustic signal detected, the control signal exhibiting the characteristic that when passed through gas bubbles present in the liquid a portion of the acoustic signal will be reflected to a second receiver positioned transverse to the emission direction, the second receiver constructed and arranged to detect the reflected signal and assign a value to the reflected signal detected;

b) measuring the actual gaseous content of a liquid flowing through a conduit by calculating a quotient derived by comparing the values received by the first receiver and by the second receiver, the quotient being proportional to the actual quantity of gas present in the liquid;

c) determining the difference between the measured gaseous content and a predetermined allowable gaseous level;

d) changing the volume flow of the liquid in dependance of the determined difference level so that the volume is reduced with increasing gaseous content and enhanced with decreasing gaseous content;

e) collecting the actual gaseous content of the liquid by selfdegassing in a collection area;

f) removing the separated gaseous content when the liquid reaches a predetermined level; and g) measuring the volume of the liquid downstream of the collection area.

* * * * *